3,407,352
METHOD OF AND APPARATUS FOR MONITORING THE THICKNESS OF A NON-CONDUCTIVE COATING ON A CONDUCTIVE BASE
William M. Smith, Jersey City, N.J., assignor to Western Electric Company, Incorporated, New York, N.Y., a corporation of New York
Filed June 7, 1965, Ser. No. 462,031
19 Claims. (Cl. 324—40)

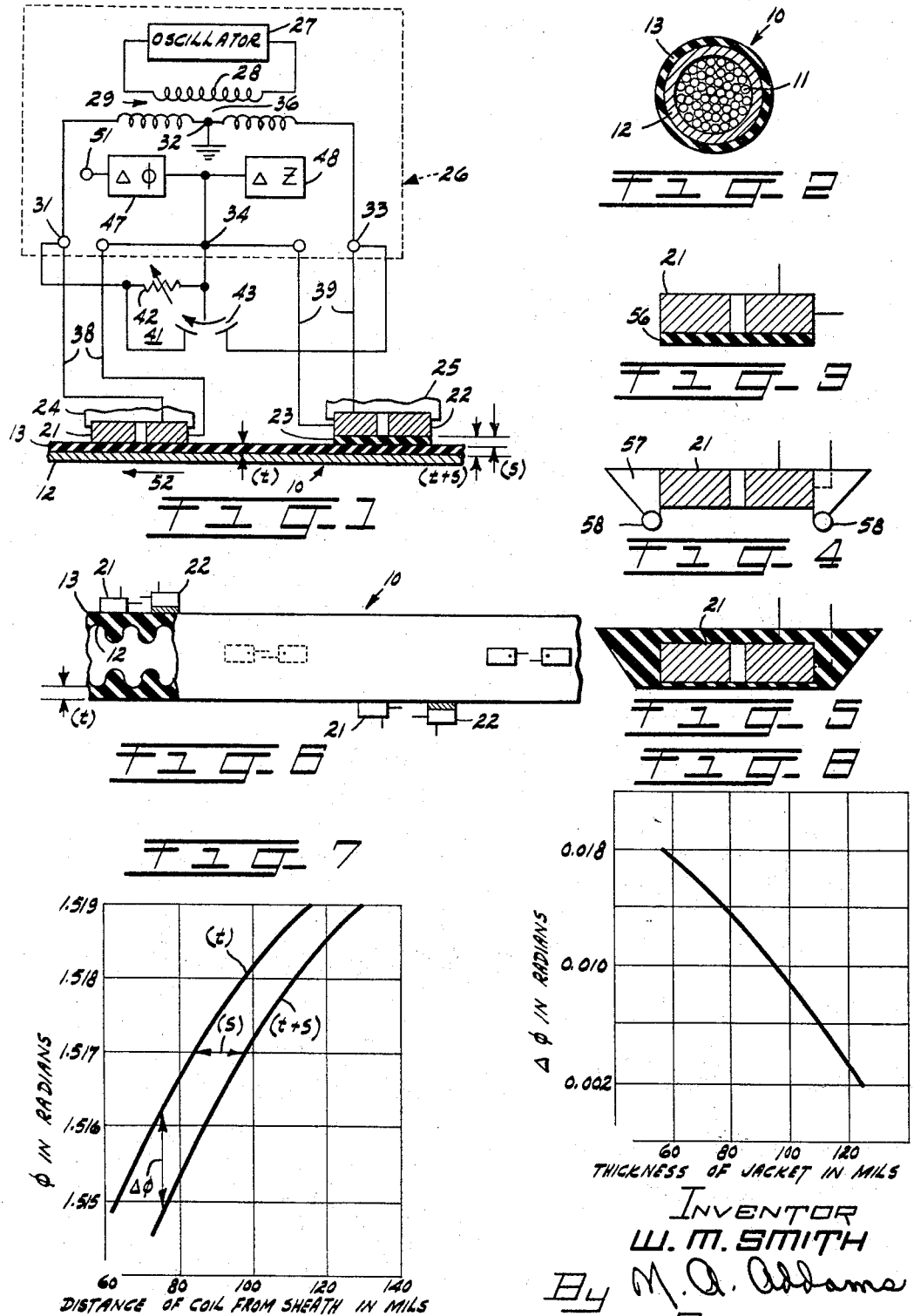

ABSTRACT OF THE DISCLOSURE

The disclosure involves a method and apparatus for monitoring continuously the thickness of a plastic sheath surrounding a metal sheath of telephone cable as the cable is in axial travel from a plastic extruder. A first magnetic coil is supported slidably against the jacket. A second magnetic coil is supported a fixed distance away from the jacket. A spacer insulator is slidable against the jacket and is mounted between the second coil and jacket to maintain the fixed separation therebetween. The coils are connected as two arms of a measuring bridge. The bridge, and thus the coils, are electrically energized, whereby out of phase signals are produced in the coils which are indicative of the jacket thickness. The coils are axially spaced apart along the cable axis to avoid magnetic coupling between the coils. Detecting means in one bridge cross-arm measures the phase difference between the signals, and thus provides a direct reading of the thickness of the extruded plastic immediately after extrusion, whereby prompt corrective measurements may be made at the extrusion station to maintain a uniform jacket thickness.

---

This invention relates to a method of and apparatus for monitoring the thickness of a non-conductive coating on a conductive base, and more particularly, to such a method and apparatus for continuously monitoring the thickness of a non-conductive jacket on a conductive sheath of a continuously advancing cable.

In the manufacture of certain types of telephone cable, a conductive metal strip is wrapped around a core comprising a plurality of individually insulated conductors, the overlapping edges of the strip being bonded together to form a sheath around the core. Thereafter, a non-conductive jacket is extruded over the metal sheath. The jacketed cable is then passed through a relatively long water cooling trough to reduce the temperature of the plastic jacket. It is desirable to continuously monitor the thickness of the jacket, among other things, to maintain uniform thickness of the jacket and to conserve the consumption of plastic material by applying the minimum acceptable jacket thickness.

In one prior art method of monitoring the thickness of a plastic jacket on a metal sheath of a continuously advancing cable, the capacitance is measured between the metal sheath and an electrode placed in direct contact with the plastic jacket. The measured capacitance is a function of, among other things, the dielectric constant of the plastic and the distance between the electrode and the sheath, this distance being the jacket thickness.

This prior art method is satisfactory when the dielectric constant of the plastic is independent of temperature, or when a plastic whose dielectric constant is not independent of temperature is accurately maintained at a predetermined temperature. However, when measuring the capacitance of a plastic whose dielectric constant is not independent of temperature, an inaccurate measurement will probably be obtained because the temperature of the plastic varies due to the heat resulting from bonding the metal sheath and the heat from the extrusion of the plastic onto the sheath.

In another prior art method of monitoring the thickness of a plastic jacket on a metal sheath on a continuously advancing cable, a first magnetic coil is placed in direct contact with the jacket. A second identical magnetic coil is then spaced a fixed distance, equal to the nominal thickness of the sheath metal, from a standard or reference located at some arbitrary distance from the cable, the standard being a metal of the same kind as the sheath. A source of signals is connected to energize the coils. A detector is connected to measure the phase difference between the signals in the respective coils due to the induced eddy currents in the sheath and the standard, the phase difference being an indication of the jacket thickness relative to the standard thickness. The eddy currents flowing in the respective coils are a function of, among other things, (1) the thickness and resistivity of the sheath metal and the standard, (2) the coupling or distance between the first coil and the sheath and the second coil and the standard, respectively, and (3) the magnetic coupling between the coils.

Commercially available metal strips for making cable sheaths are represented as having a nominal thickness and resistivity, but in fact, the thickness and resisitivity of such strips vary from the nominal values along their length. Thus, the above-described prior art eddy current method cannot compensate for variations in thickness and resistivity of the strips because the standard is of the nominal thickness and resistivity; whereas, at any instant of time, the portion of the sheath under the first coil may vary in thickness and resistivity. Furthermore, this eddy current method does not compensate for the effects of any magnetic coupling between the magnetic fields of the respective coils.

Since the magnitude of the induced eddy currents in the coils is a function of the thickness and resistivity of the metal sheath and the magnetic coupling between the coils, and since the dielectric constant of many jacket materials is not constant, an accurate method for continuously monitoring the thickness of a plastic jacket on a metal sheath of a cable should be independent of (1) the variations in the sheath metal thickness and resistivity, (2) the magnetic coupling between the coils, and (3) the dielectric properties of the jacket material. In the prior art eddy current method, a new standard could be made from each roll of sheath metal; however, in a manufacturing production line, such procedure would be impractical, and still the method would not be independent of the variations in thickness and resistivity of the sheath metal.

It is also desirable to monitor the jacket thickness as soon as possible after the plastic has been extruded onto the metal sheath, in order to feed back information to control the extruder. In the above-described method of manufacturing a telephone cable, the monitoring of the jacket thickness is performed after the cable leaves the water cooling trough. Thus, a considerable amount of cable may be produced before any information is fed back to control the extruder to correct for deviations in the jacket thickness.

Accordingly, an object of this invention is to provide a new and improved method of and apparatus for monitoring the thickness of a non-conductive coating on a conductive base. A related object is to provide such a method and apparatus for continuously monitoring the thickness of a non-conductive jacket on a conductive sheath of a continuously advancing cable.

Another object is to provide a method of and apparatus for monitoring the thickness of a plastic jacket on a metal sheath of a cable independenly of the dielectric properties of the plastic and variations in the properties of the metal.

Another object is to provide a method of and apparatus for continuously monitoring the thickness of a non-conductive jacket on a conductive sheath of a continuously advancing cable wherein variations in sheath thickness and resistivity are compensated for independently of a fixed standard. A corollary object is the provision of such a method and apparatus wherein the sheath on the advancing cable is its own reference.

Another object is to provide a method of and apparatus for continuously monitoring the thickness of a plastic jacket on a metal sheath surrounding the core of a continuously advancing cable, wherein a first magnetic coil is contiguous with the jacket, and a second magnetic coil is contiguous with a non-conductive spacer which in turn is in contact with the plastic jacket to provide a running reference.

With these and other objects in view, an apparatus for monitoring the thickness of a non-conductive coating on a conductive base, illustrating certain features of the invetnion, may include first and second magnetic coils mounted to follow the surface of the coating at differential vertical distances from the coating with respect to each other. The coils are sufficiently spaced apart along the base to prevent magnetic coupling between the coils. A signal source is provided for energizing the coils to induce eddy currents in the base, the eddy currents rendering the signals in the respective coils out of phase with respect to each other, the phase difference being an indication of the coating thickness.

A method of monitoring the thickness of a nonconductive coating on a conductive base, according to the invention, includes the following steps: supporting first and second magnetic coils such that the coils follow the surface of the coating at differential vertical distances with respect to each other from the surface, and are spaced sufficiently apart along the base to prevent magnetic coupling between the coils; and applying a signal to the coils to induce eddy currents in the base, the eddy currents rendering the signals in the coils out of phase with respect to each other, the phase difference being an indication of the coating thickness.

The method and apparatus of this invention have several advantages over the above-described prior art methods of monitoring the thickness of a non-conductive coating on a conductive base, particularly when applied to a plastic jacket on a metal sheath of a continuously running cable. One advantage is that the monitoring is performed independently of the dielectric properties of the plastic jacket and independently of variations in certain properties of the sheath metal, such as thickness and resistivity. Another advantage is that a new standard need not be prepared for each roll of sheath metal used. A further advantage is that the monitoring can be performed in the water cooling trough immediately after the cable emerges from an extruder.

Other objects and advantages of the invention will become apparent by reference to the following detailed specification and accompanying drawings, wherein:

FIG. 1 is a schematic diagram of an apparatus for monitoring the thickness of a non-conductive coating on a continuously advancing conductive base, the apparatus including first and second magnetic coils, embodying certain principles of the invention;

FIG. 2 is an end view of a telephone cable having a non-conductive jacket surrounding a conductive metal sheath, FIGS. 3–5 are views showing illustrative configurations of supports for the magnetic coils;

FIG. 6 is a schematic diagram of a system in which four of the apparatus shown in FIG. 1 are used to monitor the thickness of a jacket on a cable;

FIG. 7 is a graph of phase angle of the signal in the coils versus distance of the coils from the base; and FIG. 8 is a calibration of difference in phase angle of the signals in the coils versus thickness of the coating.

Referring to FIG. 2, there is shown a telephone cable 10 including a core 11 comprised of a plurality of individually insulated conductors. Core 11 is surrounded by an electrically conductive, aluminum sheath 12 which serves as an electrostatic shield, protective armor, or the like. Sheath 12 may be constructed of any of a number of other conductive materials, for example steel, or the like, the only requirement being that it be conductive. Sheath 12 is in turn covered with a polyvinylchloride plastic jacket 13 which serves to protect the conductors against moisture and other hazards. Jacket 13 may be constructed of any of a number of other non-conductive materials for example, polyethylene, rubber, or the like, the only requirement being that it be non-conductive.

Referring to FIG. 1, there is schematically shown an apparatus having particular application to the continuous monitoring of the thickness of jacket 13 on sheath 12 of a continuously advancing cable 10 (FIG. 2). However, it is to be understood that the apparatus shown in FIG. 1 has a general utility for measuring the thickness of a non-conductive coating on a conductive base, for example, thin films on metal sheets or foils, coatings on pipes, cables or the like, on either a dynamic or static basis.

In FIG. 1, a first magnetic coil 21 is in contact with jacket 13 of cable 10, and a second magnetic coil 22 is in contact with a spacer 23 of non-conductive material which is in contact with jacket 13. Coils 21 and 22 are mounted in conventional devices 24 and 25, respectively, for supporting the coils such that their axes are maintained substantially perpendicular to the surface of jacket 13. Mounting devices 24 and 25 are only shown schematically since they form no part of the invention. Coils 21 and 22 are spaced a sufficient distance apart along cable 10 to prevent any magnetic coupling between their respective magnetic fields when signals are applied to energize them.

Coils 21 and 22 are connected to a hybrid-coil bridge 26 having an oscillator 27, and four legs interconnected by junctions 31–34. The output of oscillator 27 is connected to a primary winding 28 of a transformer 29. Secondary winding 36 of transformer 29 has a center tap connected to junction 32, which is connected to ground, so that the one half of winding 36 is connected between junctions 31 and 32, and the other half between junctions 32 and 33. Leads 38 and 39 connect coils 21 and 22, respectively, to junctions 31 and 34, and 34 and 33.

A balancing unit 41, comprising a variable resistor 42 and a differential capacitor 43, is connected to junctions 31, 33 and 34, to balance out any difference in resistance and capacitance in leads 38 and 39. A conventional electronic phase meter 47 is connected to the bridge output terminal at junction 34 to measure the phase angle difference ($\Delta\phi$) between the signals in coils 21 and 22; and, a conventional electronic impedance meter 48 is connected to junction 34 to measure the difference in impedance ($\Delta Z$) between coils 21 and 22 due to signals therein. An output terminal 51 is provided for coupling an output signal from phase meter 47 to a recorder (not shown), a control for an extruder apparatus (not shown), or the like.

Bridge 26 may be any of a number of commercially available bridges of the type described above, for example, an Impedance Comparator, type 1605A, manufactured by the General Radio Company. In the interest of simplicity and because the bridge itself forms no part of the invention it has not been shown and described in detail, but in schematic form only.

Operation

In the operation of the apparatus depicted in FIG. 1: coil 21 is in direct contact with jacket 13 of cable 10, coil 22 is in contact with spacer 23 which is in contact with jacket 13, and cable 10 is continuously advancing in the direction of arrow 52. Oscillator 27 couples a signal of a predetermined frequency to transformer 29, the signal being applied to energize coils 21 and 22. The magnetic flux developed in each coil 21 and 22 induces eddy currents in sheath 12 in the proximity of the respective coils. The magnitude of the respective eddy currents depends upon the properties of sheath 12, particularly its resistivity and thickness, and the coupling between sheath 12 and coils 21 and 22, respectively.

The phase angle ($\phi$) of the signal in each coil 21 and 22 is determined in accordance with the following equation:

(1)
$$\phi = \tan^{-1} \frac{2\pi f L_e}{R_e}$$

where $\phi$ = phase angle in radians
$f$ = the frequency of the applied signal in cycles per second,
$L_e$ = the effective inductance of the coil in henries, and includes the reflected impedance due to the eddy currents in sheath 12,
$R_e$ = the effective resistance of the coil in ohms and includes the reflected resistance losses due to the eddy currents in sheath 12.

The inductance ($L_e$) and resistance ($R_e$) of the respective coils 21 and 22 vary with the distance of the coils from sheath 12, the variations being due to the magnitude of the induced eddy currents in sheath 12 in the proximity of the respective coils. Thus, the phase angle of the signals in the respective coils 21 and 22, with respect to the applied signal is a function of the respective eddy currents in sheath 12, and is different in each coil due to the differential vertical or radial distance of the coils from sheath 12.

It has been determined experimentally that the distance of coils 21 and 22 respectively, from sheath 12 can be expressed by the following equations:

(2) $\quad t = K_1 \tan \phi_{21} + K_2$
(3) $\quad t+s = K_1 \tan \phi_{22} + K_2$ where
$t$ = the thickness of jacket 13
$s$ = the thickness of spacer 23
$t+s$ = the distance of coil 22 from sheath 12
$K_1$ and $K_2$ = constants which are dependent on the sheath metal and its nominal thickness, core diameter, and physical arrangement of the sheath metal, that is, smooth, corrugated, or other.

Equations 2 and 3 can be simultaneously solved for the thickness of jacket 13:

(4)
$$t = \frac{-(s-2K_2) \pm \sqrt{(s-2K_2)^2 - (4K_1)^2 - K_2(s-K_2) + \frac{K_{1s}}{\tan(\phi_{21}-\phi_{22})}}}{2}$$

From Equation 4, $\phi_{21}-\phi_{22}$, or $\Delta\phi$ can be correlated to the thickness of jacket 13. Constants $K_1$ and $K_2$ can be experimentally determined for each sheath metal of a particular core diameter, nominal thickness, and physical arrangement, used for sheath 12 as follows. Coil 21 is connected to bridge 26 as shown in FIG. 1, and phase angle measurements are recorded for different known thicknesses of jacket 13. This data is plotted as a curve of $\phi_{21}$ versus distance of coil 21 from sheath 12, and the equation of the curve is solved to determine values for $K_1$ and $K_2$. Since phase meter 47 directly gives $\Delta\phi$ and since $K_1$ and $K_2$ are now known, Equation 4 can be solved for the thickness of jacket 13 in terms of $\Delta\phi$. However, the solving of Equations 2, 3, and 4 many times over is very laborious.

Referring to FIG. 7, there is shown a graph correlating phase angle $\phi$ in radians with the distance of coils 21 and 22 from sheath 12 for a particular sheath metal. In an experimental use of the invention, sheath 12 was corrugated aluminum, nominally 0.008 inch thick, on a 2.0 inch diameter core 11, with spacer 23 being 0.015 inch thick. The curve for $(t)$ was constructed by obtaining phase angle measurements for different known thicknesses of jacket 13. The curve for $(t+s)$ can be constructed in a similar manner, but was actually constructed by drawing the curve for $(t+s)$ parallel to curve $(t)$ spaced a distance $(s)$ away. It was then a simple matter to construct a calibration curve of $\Delta\phi$ versus thickness $(t)$ of jacket 13 (see FIG. 8), and to calibrate phase meter 47 in terms of thickness $(t)$ of jacket 13.

It is to be noted that the dielectric properties of the material of jacket 13, and the variations in thickness from the nominal thickness and resistivity of sheath 12, are not involved in an analysis of Equations 2–4. Also, coil 22 can be considered to be a "running reference" since it is always in contact, through spacer 23, with jacket 13, and at any instant of time the thickness of sheath 12 is assumed to be the same under coils 21 and 22. Experimentation has shown that this assumption does not introduce any appreciable error into the accuracy of the monitoring of the thickness of jacket 13, when the monitoring was checked by measuring the thickness of jacket 13 by other means, such as by a micrometer.

In an actual embodiment of an apparatus constructed for testing the invention, balancing bridge 26 was an Impedance Comparator, type 1605A, manufactured by the General Radio Company. Coils 21 and 22 were matched as closely as possible, and had approximately 1 millihenry inductance with effective resistance of 40 ohms at an applied signal of 100 kc. The coils were spaced approximately 12 inches apart to prevent any magnetic coupling therebetween. Each coil was approximately 9/16 inch in diameter, ¼ inch thick, and duolaterally wound with cotton-covered enamel wire on 3/16 inch diameter core.

It will be obvious to one skilled in the art that other conventional instruments for measuring the phase angle difference, and that other coils having other characteristics and dimensions, as long as they are matched, may be employed.

Embodiments of coil supports

In FIG. 3, a strip 56 of a material having a low coefficient of friction, for example "Teflon" plastic, is placed between jacket 13 and coil 21 to prevent wearing of the coil. In FIG. 4, coil 21 is supported in a carriage 57 having rollers 58 which contact the jacket 13, for the same purpose. Although coil 21 (in FIGS. 3 and 4) does not actually contact jacket 13, as does coil 21 shown in FIG. 1, it is only necessary that coils 21 and 22 be differentially spaced with respect to each other from the surface of jacket 13, and that they both follow the contour of the surface of jacket 13. Strip 56 (FIG. 3) and rollers 58 (FIG. 4) are in contact with jacket 13, and coil 22 is in contact with spacer 23 which is in contact with jacket 13; therefore, coils 21 and 22 follow the contour of the surface of jacket 13.

Referring to FIG. 5, there is shown a coil 21 which is encapsulated in a water impervious material, for example, epoxy, plastic, or the like. Coil 22 (not shown in FIG. 5) is also encapsulated in a water impervious material, but includes a spacer 23, or an extra thickness of the water impervious material is provided along the bottom of coil 22 to provide the required differential vertical spacing of the coils from jacket 13.

In certain cable manufacturing processes, the cable is impassed through a water cooling trough (not shown) immediately after plastic jacket 13 has been extruded onto the cable. Encapsulated coils 21 and 22 are placed under the water in the cooling trough and are connected to the apparatus shown in FIG. 1 to monitor the thickness of jacket 13 as soon as the cable enters the trough. In this manner, an output signal at terminal 51 of phase meter 47 is fed back immediately to control the extruder apparatus, before an appreciable amount of cable having a jacket thickness, which deviates from the desired thickness, can be produced.

In the use of the apparatus shown in FIG. 1, the thickness of only one longitudinal strip of jacket 13 is monitored. It is possible that cable 10 may not be perfectly concentric, the concentricity depending upon the sophistication of the extrusion apparatus. Therefore, the longitudinal strip being monitored may not be a true sample of jacket 13. To overcome this potential inaccuracy, in FIG. 6 four monitoring apparatus are spaced about the circumference of cable 10 at substantially 90° with respect to each other, and are longitudinally spaced along the cable a sufficient distance apart to prevent any magnetic coupling between any of the coils 21 or 22 of any of the four apparatus. As an alternative to the arrangement of four monitoring apparatus shown in FIG. 6, a single monitoring apparatus can be mounted on a carriage which is slowly rotated about the periphery of the cable as the cable is advancing.

It is to be understood that the above-described methods and apparatus are merely illustrative of the principles of the invention, and other embodiments may be devised without departing from the scope of the invention.

What is claimed is:

1. In an apparatus for monitoring the thickness of a non-conductive coating on a conductive base,
   first and second magnetic coils,
   means for mounting the coils such that the coils follow the surface of the coating at different distances from the surface, and such that the coils are spaced apart along the base a distance sufficient to prevent magnetic coupling between the coils,
   means for energizing the respective coils to produce signals therein which are out of phase with respect to each other, the phase difference being representative of the coating thickness, and
   means for detecting the phase difference between the signals.

2. In an apparatus for monitoring the thickness of a non-conductive coating on a conductive base,
   first and second magnetic coils,
   means for mounting the coils such that the first coil follows the surface contour of the coating and the second coil follows the surface contour of the coating at a fixed distance above the first coil, the coils being spaced apart along the base to prevent magnetic coupling between the coils,
   means for energizing the respective coils to produce signals therein which are are out of phase with respect to each other, and
   means for detecting the phase difference between the signals, and phase difference being calibrated to the thickness of the coating.

3. In an apparatus for monitoring the thickness of a non-conductive coating on a conductive base,
   a first magnetic coil mounted to be contiguous with a non-conductive coating on a conductive base,
   a second magnetic coil mounted to be contiguous with the coating but at a fixed vertical distance from the first coil, the coils being spaced apart along the base a distance apart sufficient to prevent magnetic coupling therebetween,
   means for energizing the coils to produce signals in the respective coils which are out of phase with each other due to the differential vertical distance between the coils, and
   means for detecting the phase difference between the signals, the phase difference being calibrated to the thickness of the coating.

4. In an apparatus for monitoring the thickness of a non-conductive coating on a continuously advancing conductive base,
   a first magnetic coil mounted for contact with a non-conductive coating on a contiguously advancing base,
   a non-conductive spacer mounted for contact with the non-conductive coating,
   a second magnetic coil mounted for contact with the spacer, the first and second coils being spaced sufficiently apart along the base to prevent magnetic coupling therebetween,
   a source of signals for energizing the coils to induce eddy currents in the base which render the signals in the respective coils out of phase with respect to each other, the phase difference being an indication of the thickness of the coating, and
   means for detecting the phase difference between the respective signals.

5. The apparatus according to claim 4, wherein the phase difference detecting means is calibrated in thickness of the coating.

6. An apparatus for monitoring the thickness of a non-conductive jacket on a conductive sheath of a continuously advancing cable, comprising:
   first and second magnetic coils,
   means for mounting the first coil to be in continuous contact with the jacket,
   a non-conductive spacer,
   means for mounting the second coil to be in contact with the spacer and for mounting the spacer to be in continuous contact with the jacket, the coils being spaced sufficiently apart along the cable to prevent magnetic coupling therebetween,
   an oscillator connected for applying a signal to develop magnetic flux in the respective coils, the magnetic flux inducing eddy currents in the sheath in the proximity of the respective coils, the eddy currents rendering the signals in the respective coils out of phase with respect to each other, the phase difference being indicative of the thickness of the jacket, and
   a phase detector for detecting the phase difference between the signals in the respective coils.

7. The apparatus according to claim 6, wherein the first and second magnetic coils are mounted in-line along the cable length to monitor the thickness of a longitudinal strip of the jacket.

8. The apparatus according to claim 6, wherein the phase detector is calibrated in units of thickness of the jacket corresponding to phase difference between the signals.

9. In a system for continuously monitoring the thickness of a non-conductive jacket on a conductive sheath of a continuously running cable, a plurality of monitoring apparatus substantially equally spaced about the circumference of the cable and longitudinally spaced with respect to each other along the cable, each apparatus comprising:
   first and second magnetic coils,
   means for mounting the first coil to be in continuous contact with the jacket,
   a non-conductive spacer,
   means for mounting the second coil to be in contact with the spacer and for mounting the spacer to be in continuous contact with the jacket, the coils being spaced sufficiently apart along the cable to prevent magnetic coupling therebetween,
   an oscillator connected for applying a signal to develop magnetic flux in the respective coils, the flux inducing eddy current in the sheath in the proximity of the respective coils, the eddy currents rendering the signals in the respective coils out of phase with respect to each other, the phase difference being indicative of the thickness of the jacket, and a phase detector for detecting the phase difference between the signals in the respective coils.

10. In a system for continuously monitoring the thickness of a non-conductive jacket on a conductive sheath of a continuously running cable, wherein the cable is passed through a liquid cooling trough immediately after the jacket is applied to the sheath, an apparatus comprising:

first and second magnetic coils encapsulated in a liquid impervious material, means for mounting the encapsulated coils in the trough such that the first coil follows the surface contour of the jacket and the second coil follows the surface contour at a fixed height above the first coil, the coils being spaced sufficiently apart along the cable to prevent magnetic coupling therebetween, an oscillator connected for applying a signal to develop magnetic flux in the respective coils, the flux inducing eddy currents in the sheath in the proximity of the respective coils, the eddy currents rendering the signals in the respective coils out of phase with respect to each other, the phase difference being indicative of the thickness of the jacket, and a phase detector for detecting the phase difference between the signals in the respective coils.

11. In a system for continuously monitoring the thickness of a non-conductive jacket on a conductive sheath of a continuously running cable, wherein the cable is passed through a liquid cooling trough immediately after the jacket is applied to the sheath, an apparatus comprising:

first and second magnetic coils encapsulated in a liquid impervious material, the thickness of the material on the second coil being thicker than on that of the first coil, means for supporting the encapsulated coils in the trough such that the coils follow the surface contour of the jacket at different vertical distances therefrom due to the greater thickness of impervious material on the second coil, an oscillator connected for applying a signal to develop magnetic flux in the respective coils, the flux inducing eddy currents in the sheath in the proximity of the respective coils, the eddy currents rendering the signals in the respective coils out of phase with respect to each other, the phase difference being indicative of the thickness of the jacket, and a phase detector for detecting the phase difference between the signals in the respective coils.

12. In a system for continuously monitoring the thickness of a non-conductive jacket on a conductive sheath of a continuously running cable, wherein the cable is passed through a liquid cooling trough immediately after the jacket is applied to the sheath, an apparatus comprising:

a first magnetic coil encapsulated in a water impervious material, a non-conductive spacer, a second magnetic coil placed in contact with the spacer, the second coil and spacer being encapsulated in a water impervious material, means for supporting the encapsulated coils in the trough such that the first coil and the spacer follow the surface contour of the jacket, an oscillator connected for applying a signal to develop magnetic flux in the respective coils, the flux inducing eddy currents in the sheath in the proximity of the respective coils, the eddy currents rendering the signals in the respective coils out of phase with respect to each other, the phase difference being indicative of the thickness of the jacket, and a phase detector for detecting the phase difference between the signals in the respective coils.

13. A method of monitoring the thickness of a non-conductive coating on a conductive base, comprising the steps of:

supporting first and second magnetic coils such that the coils follow the surface contour of the coating at differential distances with respect to the surface contour, spacing said coils apart along the base to prevent magnetic coupling therebetween, coupling a signal to energize the coils for inducing eddy currents in the base, the eddy currents rendering the signals in the respective coils out of phase with respect to each other and detecting the phase difference between the signals in the respective coils.

14. The method according to claim 13, and further comprising the step of:

correlating the phase difference between the signals with a predetermined phase difference-coating thickness calibration for the particular base to determine the thickness of the coating.

15. A method of continuously monitoring the thickness of a non-conductive coating on a conductive base, comprising the steps of:

placing a first magnetic coil in contact with the coating, placing a second magnetic coil a fixed vertical distance above the first coil and a sufficient distance apart along the base to prevent magnetic coupling between the coils, energizing the coils to produce signals in the respective coils that are out of phase with respect to each other due to the differential vertical distance between the coils, and measuring the phase difference between the signals in the respective coils to ascertain the thickness of the coating.

16. A method of monitoring the thickness of a non-conductive coating on a continuously advancing conductive base, comprising the steps of:

supporting a first magnetic coil to follow the surface contour of the coating, supporting a second magnetic coil to follow the surface contour of the coating at a predetermined distance above the first coil, spacing said coils apart along the base to prevent magnetic coupling therebetween, applying a signal to develop magnetic flux in the coils for inducing eddy currents in the base in the proximity of the respective coils, the eddy currents rendering the signals in the coils out of phase with respect to each other, and detecting the phase difference between the signals in the respective coils.

17. The method according to claim 16, and further comprising the step of determining by the detected difference in phase and a predetermined phase difference-coating thickness calibration for the particular base the thickness of the coating.

18. In a method of continuously monitoring the thickness of a non-conductive jacket on a conductive sheath of a continuously running cable, the steps of:

placing a first magnetic coil in contact with the jacket, placing a non-conductive spacer in contact with the jacket, placing a second magnetic coil in contact with the spacer, spacing the second coil and the spacer along the cable from the first coil to prevent magnetic coupling between the coils, coupling a signal to energize the coils for inducing eddy currents in the sheath in the proximity of the respective coils, the eddy currents rendering the signals in the respective coils out of phase with respect to each other, and measuring the phase difference between the signals in the respective coils to ascertain the thickness of the jacket.

19. The method according to claim 18, wherein conductive sheaths having known properties have a predetermined phase difference-coating thickness calibration, further comprising the step of:

determining by the phase difference-coating thicknss calibration for the particular sheath the thickness of the coating.

References Cited
UNITED STATES PATENTS

| | | | |
|---|---|---|---|
| 1,815,710 | 7/1931 | Guillemin | 324—40 |
| 2,266,620 | 12/1941 | Coffman | 324—40 |
| 2,929,985 | 3/1960 | Havelka | 324—34 |
| 2,758,276 | 8/1956 | Foerster | 324—34 |
| 2,957,129 | 9/1960 | Irwin | 324—37 |

RUDOLPH V. ROLINEC, *Primary Examiner.*

P. A. URIBE, *Assistant Examiner.*